(12) United States Patent
Rawal et al.

(10) Patent No.: US 11,520,794 B2
(45) Date of Patent: Dec. 6, 2022

(54) DATA INGESTION WITH SPATIAL AND TEMPORAL LOCALITY

(71) Applicant: Elastic Flash Inc., Saratoga, CA (US)

(72) Inventors: Darshan Bharatkumar Rawal, Fremont, CA (US); Naoki Iwakami, Redwood City, CA (US); Pradeep Jnana Madhavarapu, Cupertino, CA (US)

(73) Assignee: Elastic Flash Inc., Saratoga, CA (US)

( * ) Notice: Subject to any disclaimer, the term of this patent is extended or adjusted under 35 U.S.C. 154(b) by 155 days.

(21) Appl. No.: 17/144,054

(22) Filed: Jan. 7, 2021

(65) Prior Publication Data

US 2021/0209115 A1    Jul. 8, 2021

Related U.S. Application Data

(60) Provisional application No. 62/957,946, filed on Jan. 7, 2020.

(51) Int. Cl.
| | | |
|---|---|---|
| *G06F 7/02* | (2006.01) | |
| *G06F 16/00* | (2019.01) | |
| *G06F 16/2455* | (2019.01) | |
| *G06F 16/22* | (2019.01) | |
| *G06F 16/28* | (2019.01) | |

(52) U.S. Cl.
CPC .... *G06F 16/24568* (2019.01); *G06F 16/2219* (2019.01); *G06F 16/285* (2019.01)

(58) Field of Classification Search
CPC ............ G06F 16/24568; G06F 16/285; G06F 16/2219
See application file for complete search history.

(56) References Cited

U.S. PATENT DOCUMENTS

| 7,991,905 B1 * | 8/2011 | Roussos .................. H04L 65/80 709/231 |
| 2007/0274681 A1 * | 11/2007 | Andolph .............. G11B 27/105 |
| 2009/0310663 A1 * | 12/2009 | Menon ................... H04L 69/14 375/225 |

* cited by examiner

*Primary Examiner* — Bruce M Moser
(74) *Attorney, Agent, or Firm* — IP Spring

(57) ABSTRACT

Implementations described herein relate to methods, systems, and computer-readable media to write data records. In some implementations, a method may include calculating a data rate of a data stream that includes a plurality of data records and determining if the data rate of the data stream is less than an ingest threshold. The method may further include, if the data rate of the data stream is less than the ingest threshold, calculating a number of write requests per time unit based on the data stream; determining a storage capacity per storage bucket; determining a read interval for the data stream; based on the number of write requests per time unit, the storage capacity, and the read interval, selecting a size of time window per storage bucket; and writing the plurality of data records to a particular storage bucket.

20 Claims, 4 Drawing Sheets

DATA INGESTION WITH SPATIAL AND TEMPORAL LOCALITY

RELATED APPLICATIONS

This application claims the benefit of priority to U.S. Provisional Application No. 62/957,946 filed Jan. 7, 2020, which is incorporated herein by reference in its entirety.

BACKGROUND

Data streams are generated by a variety of data sources. For example, millions of Internet-of-Things (IoT) devices such as temperature/pressure sensors, smart locks, smart doorbells, smoke detectors, intrusion detection systems, industrial sensors, sensors on-board a vehicle, etc. generate a stream of data corresponding to measurements performed, e.g., a time-series of temperature readings, alerts that a door was locked or unlocked, values of a process parameter (e.g., reaction temperature) in an industrial process, and so on. Web data sources, e.g., e-commerce web servers, advertising web servers, etc. also generate streams of data, e.g., data related to page views, purchases, advertisements delivered to and/or clicked by customers, etc. Still further, software applications, e.g., mobile and/or desktop applications also generate data streams, e.g., login/logout events, security events, file creation/modification events, etc.

Further, many applications, e.g., e-commerce applications, security applications, etc. perform analytics on data streams. For example, an e-commerce application may provide a recommendation for an item to purchase based on what a user has in their shopping cart; a security application may analyze network traffic patterns to detect abnormal device behavior; etc. Many such applications perform data analytics on received data in data streams.

The functionality of many such applications is to perform analytics in real-time or near real-time. To enable such data analysis, it is important that data in the received data stream is stored and made available for analytics within a short time. Further, different data streams may have different characteristics, e.g., average size of records in the data stream, reliability requirements for data storage, number of records per time period, etc. Different analytics applications also have different characteristics, e.g., frequency at which analyses are performed, number of records analyzed per iteration, type of analyses performed, etc.

The storage devices used to store data received via data streams are also required to support read requests from analytics applications. Therefore, a flexible storage mechanism that can account for varying ingestion and analytics workloads is necessary to support data sources that generate data streams and analytics applications that analyze data in the received data streams. Current storage mechanisms are static configurations that not flexible (e.g., that optimize either for ingestion or for analytics) and are and cannot support the volumes of streaming data that is generated and is to be analyzed. In some current configurations, multiple systems are used for different workloads which can be expensive and wasteful of resources.

Implementations described herein were conceived in light of some of these problems.

SUMMARY

Implementations described herein relate to methods, systems, and computer-readable media to write data records.

In some implementations, a computer-implemented method may include calculating a data rate of a data stream that includes a plurality of data records and determining if the data rate of the data stream is less than an ingest threshold. The method may further include, if the data rate of the data stream is less than the ingest threshold, calculating a number of write requests per time unit based on the data stream; determining a storage capacity per storage bucket; determining a read interval for the data stream; based on the number of write requests per time unit, the storage capacity, and the read interval, selecting a size of time window per storage bucket; and writing the plurality of data records to a particular storage bucket.

In some implementations, each data record of the plurality of data records may have a particular size and determining the storage capacity per storage bucket may include determining a maximum number of data records of the particular size that can be stored per storage bucket.

In some implementations, determining the read interval may include analyzing one or more read requests, wherein each read request includes a command to access a subset of the plurality of data records. In some implementations, determining the read interval may include selecting an initial read interval as a minimum interval at which an aggregation operation is performed on the data stream, detected based on the one or more read requests. In some implementations, the method may further include grouping the one or more read requests into a plurality of sets of read requests, each set associated with a corresponding interval, and wherein determining the read interval comprises selecting the interval associated with the set of read requests that has the most number of read requests as the read interval.

In some implementations, the method may further include, if the data rate of the data stream is greater than or equal to the ingest threshold, writing the plurality of data records such that at least a first subset of the plurality of data records is written to a first storage bucket and at least a second subset of the plurality of data records is written to a second storage bucket different from the first storage bucket.

In some implementations, the method may further include, prior to calculating the data rate, partitioning the data stream into a plurality of partitions based on one or more data dimensions of the data stream.

In some implementations, the method may further include creating a data view that includes a plurality of entries. In some implementations, the data view may be based on one or more data dimensions of the data stream. In some implementations, the method may further include storing the data view in the particular storage bucket such that the plurality of entries in the data view are stored sequentially based on at least one of the one or more data dimensions of the data stream.

In some implementations, the method may further include creating an index based on the data stream. In some implementations, the index may include a plurality of unique values for a particular data dimension of the data stream. In some implementations, the method may further include storing the index in the particular storage bucket such that the plurality of unique values are stored sequentially.

In some implementations, the method may be performed at periodic intervals or upon determination that a current data rate of the data stream is different from a previous data rate of the data stream.

Some implementations may include computing device that includes one or more processors and a memory coupled to the one or more processors, with instructions stored thereon that, when executed by the one or more processors, cause the one or more processors to perform any of the methods as described herein.

Some implementations may include a non-transitory computer-readable medium with instructions stored thereon that, when executed by one or more processors, cause the one or more processors to perform any of the methods as described herein.

DETAILED DESCRIPTION

Flexible mechanisms are provided to facilitate access to data storage for ingest workloads (e.g., data streams received from various data sources) and for extract workloads (e.g., data analytics applications). Characteristics of available storage devices and constraints are identified along with information regarding data analytics operations (e.g., data aggregation or rollup operations) and are utilized to select a write pattern for data ingestion. The write pattern can preserve spatial and/or temporal locality, and/or can support high ingest throughput.

Figure 1:
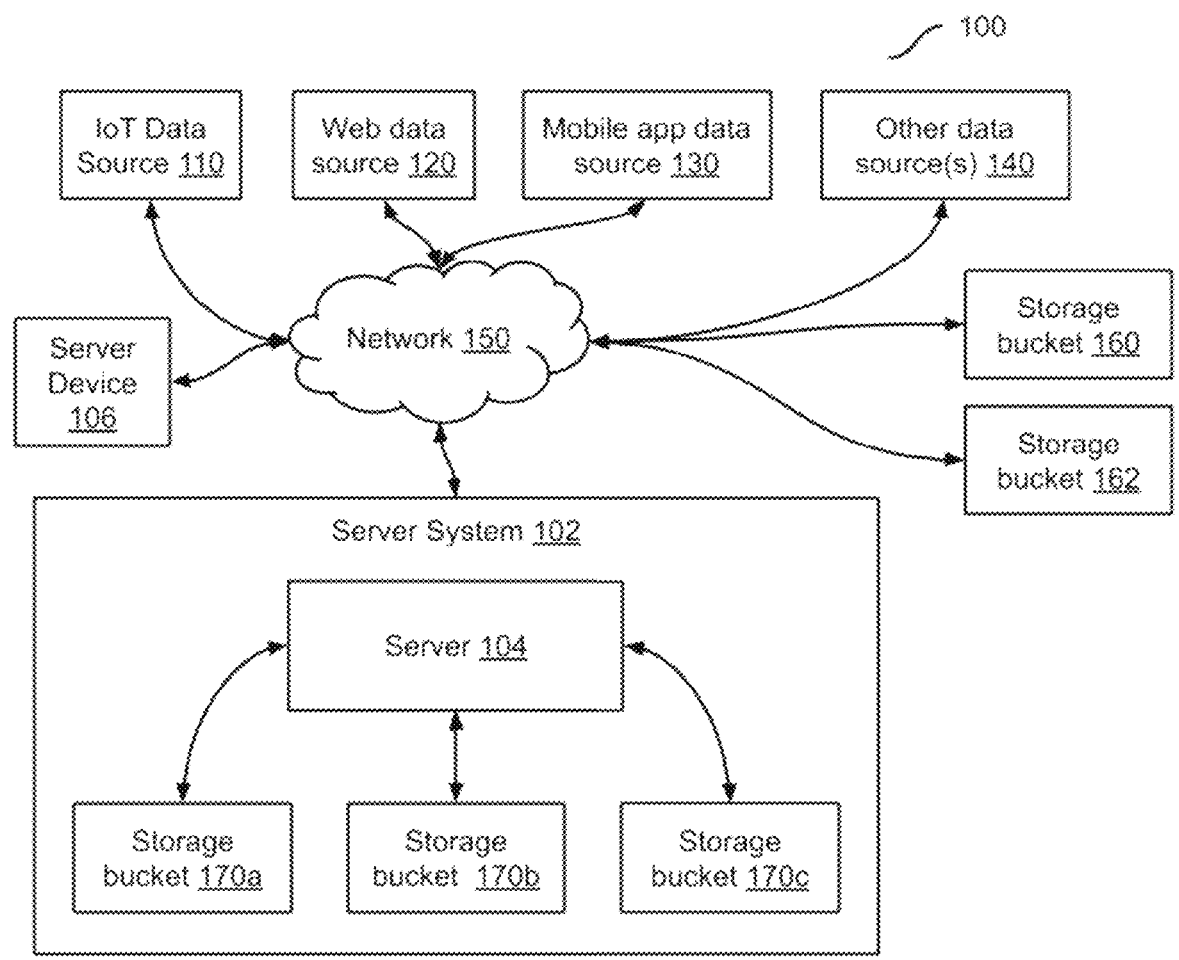
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102. Network environment 100 includes one or more data sources, e.g., an Internet-of-Things (IoT) data source (110), a web data source (120), a mobile app data source (130), and other data source(s) (140). Network environment 100 further includes one or more storage buckets, e.g., storage bucket (160) and storage bucket (162). In some implementations, network environment 100 further includes a second server device, e.g., server device 106.

Server system 102, server device 106, data sources 110-140, and storage buckets (160-162) can communicate with each other, and other systems, e.g., database systems, client devices, storage devices, etc.) over network 150.

In some implementations, server system 102 includes a server device 104. In some implementations, server device 104 is coupled to one or more storage buckets 170. For example, FIG. 1 illustrates three storage buckets—170a, 170b, and 170c. In FIG. 1 and the remaining figures, a letter after a reference number, e.g., "170a," represents a reference to the element having that particular reference number. A reference number in the text without a following letter, e.g., "170," represents a general reference to embodiments of the element bearing that reference number.

Each of storage buckets 170a-170c may include one or more storage devices, e.g., a solid-state drive (SSD), a hard disk drive (HDD), or any other type of storage device coupled to server device 104. For example, a storage device 170 may be directly coupled to server device 104 via a port or other interface of server device 104.

In some implementations, a storage bucket may be implemented using a storage container, e.g., as described in U.S. patent application Ser. No. 16/369,896. In some implementations, a single storage container may be mapped to a particular storage bucket. In some implementations, a single storage container may be mapped to a plurality of storage buckets. In some implementations, a single storage bucket may be configured to utilize a plurality of storage containers.

In some implementations, a storage bucket may be implemented using a relational database, a NoSQL database, or any other type of database. In some implementations, a storage bucket may be implemented as a custom data store where read/write/update performance of the data store is customized to particular input data sources (ingestion workload) and/or data consumers (analytics workload), e.g., by configuring the hardware (e.g., hardware type, geographic location, network connectivity, etc.) on which the data store is implemented as well as by selecting one or more parameters of the data store (e.g., redundancy or number of copies of data, master/slave or peer-to-peer architecture). Workload analysis may be performed on an initial portion of the workload in order to determine the parameters for the data store.

Storage bucket 160 and/or storage bucket 162 may include one or more storage devices, e.g., a solid-state drive (SSD), a hard disk drive (HDD), or any other type of storage device. Storage buckets 160 and/or storage bucket 162 may be network-attached storage (NAS) devices, or part of a storage-area network (SAN) that can be accessed by server device 104 via network 150. Storage buckets 160 and/or storage bucket 162 may be coupled to server device 104 via network 150. For example, a storage device 170 may be directly coupled to server device 104 via a port or other interface of server device 104.

Network-attached storage devices (e.g., that are used to implement storage buckets 160, 162) and direct attached storage devices (e.g., that are used to implement storage buckets 170a-170c) may be any type of storage devices, e.g., that provide long-term and/or short-term data storage. For example, such storage devices may include volatile memory (e.g., DRAM, SRAM, etc.) and/or non-volatile memory (e.g., NVRAM, MRAM, Flash Memory, hard disk drives, phase change memory, 3D Xpoint™, resistive RAM, etc. In some implementations, e.g., in the example illustrated in FIG. 1, storage devices 160-164 are coupled to server system 102 via network 150, e.g., as a storage area network (SAN), as network attached storage (NAS), etc.

In some implementations, storage device(s) may be coupled to server device 104 and/or server device 106 via direct attached storage protocols, e.g., NVMe, SAS, etc. Storage device(s) can include a plurality of storage devices, e.g., solid-state disks, hard drives, etc. In some implementations, both direct attached and/or network-attached storage devices may be used. In some implementations, storage devices may be directly coupled to or be a part of server system 102, e.g., coupled to one or more of server devices 104 and 106 via a direct connection (e.g., via PCI bus, USB, etc.). In some implementations, storage devices may include any number of storage devices directly coupled to server system 102, and one or more devices coupled to server system 102 via network 150.

In some implementations, storage devices may be solid-state storage devices, e.g., that utilize flash memory or other solid-state data storage technology. In some implementations, a storage device may include a plurality of channels. Each channel may be configured with a plurality of storage chips that can store blocks of data, organized into pages. In some implementations, the plurality of channels may be configured such that only a subset of chips (e.g., a single chip) within a channel can be accessed at a particular instant and other chips are not accessible at the particular instant, e.g., in a serial access configuration. Further, in these implementations, the plurality of channels may be configured to enable concurrent access, e.g., any number of channels (e.g., a subset of the channels, all channels, etc.) may be accessed at any particular instant, e.g., in a parallel access configuration. In some implementations, a storage device may include a storage controller (e.g., a special purpose microprocessor) that facilitates access to the storage device.

Server system 102 can include one or more server devices. For example, server system 102 may be a single server, e.g., with a single main processing board (motherboard) and one or more processors. In another example, server system 102 may include a plurality of servers, e.g., arranged in a server rack, in multiple server racks in a data center, in multiple data centers, etc. In this example, each server in the plurality of servers is configured to communicate with other servers via various mechanisms, e.g. over network 150.

In some implementations, server device 104 may be configured to act as an ingestion server, e.g., to receive data from data sources 110-140 and store the received data in one or more storage buckets, e.g., any of storage buckets 160, 162, or 170. In some implementations, server device 106 may be configured to act as an analytics server, e.g., to read data from one or more storage buckets, e.g., any of storage buckets 160, 162, or 170, to perform one or more analytics tasks (e.g., aggregate data in a rollup operation, compute one or more summarized variables from the stored data, etc.). A server device (104, 106) may include hardware that supports execution of software applications, e.g., one or more processors (e.g. CPU, GPU, ASIC, FPGA, etc.), memory (including volatile memory, e.g., DRAM, and/or non-volatile memory, e. g., hard disk, flash memory, 3D XPoint™, etc.), network interface, and other hardware.

For ease of illustration, FIG. 1 shows one block for server system 102 that includes a server device. Server blocks 102, 104, and 106 may represent multiple systems, server devices, and other network devices, and the blocks can be provided in different configurations than shown. For example, server system 102 can represent multiple server devices that can communicate with other server systems via the network 150. In some implementations, server system 102 can include cloud hosting servers, for example. In some implementations, network environment 100 may not have all of the components shown and/or may have other elements including other types of elements instead of, or in addition to, those described herein.

Network 150 may be any type of network that enables various systems to exchange data. Network 150 can be any type of communication network, including one or more of the Internet, local area networks (LAN), wireless networks (e.g., 802.11 networks, Bluetooth®, etc.), switch or hub connections, etc. In some implementations, network 150 can include peer-to-peer communication between devices, e.g., using peer-to-peer wireless protocols (e.g., Bluetooth®, Wi-Fi Direct®, etc.), etc. In some implementations, network 150 may include a wired network, e.g., a gigabit Ethernet network and/or a wireless network, e.g., an 802.11 network, a ZigBee® network, etc.

Figure 2:
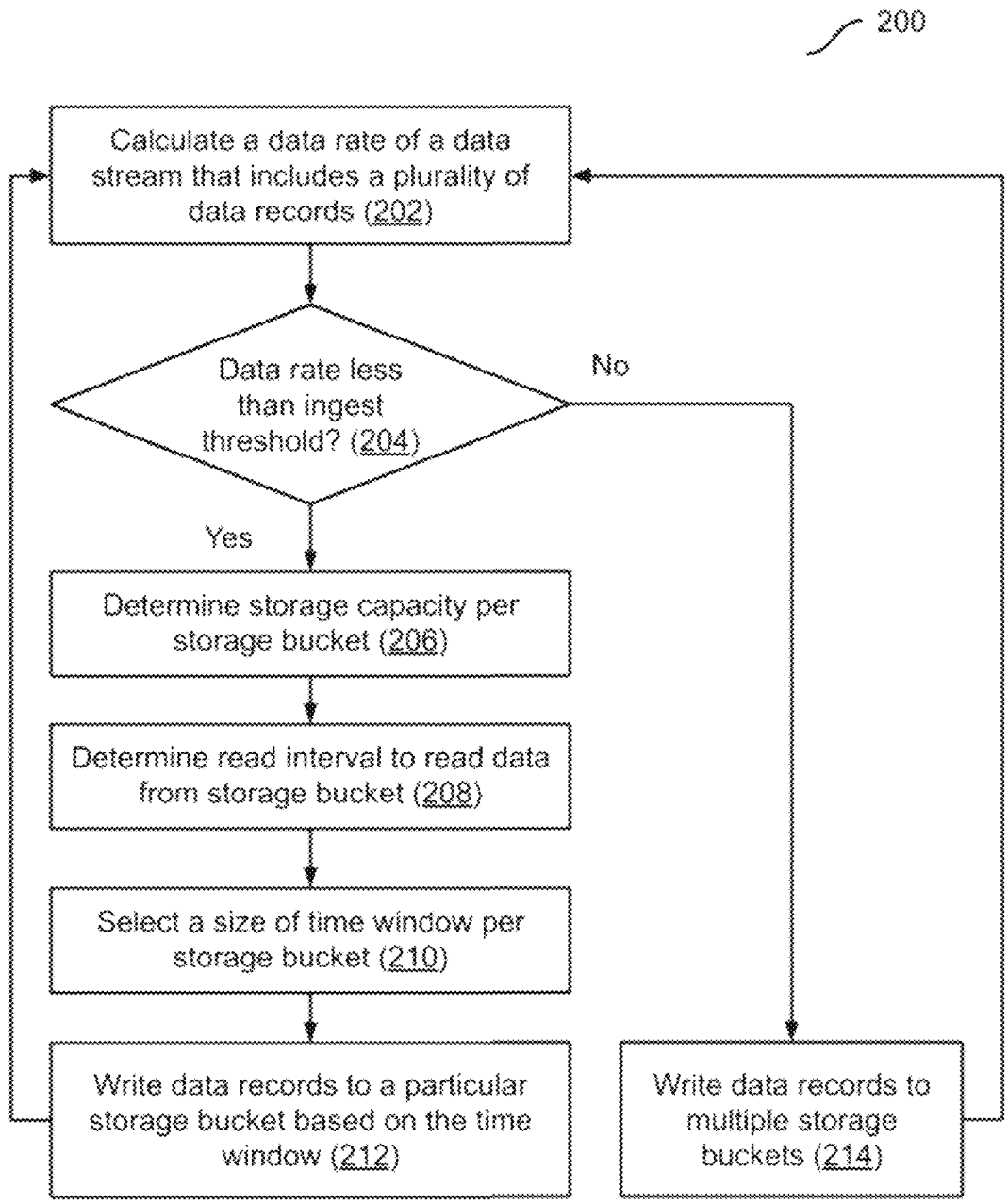
FIG. 2 is a flow diagram illustrating one example of a method 200 to allocate storage to different applications, according to some implementations described herein.

FIG. 2 is a flow diagram illustrating one example of a method 200 to ingest data from a data stream, in accordance with some implementations. In some implementations, method 200 can be implemented, for example, on a server system 102 as shown in FIG. 1. In the described examples, the implementing system includes one or more digital processors or processing circuitry ("processors"), and one or more storage buckets (e.g., storage buckets 160-162 and/or and storage buckets 170). In some implementations, different components of one or more servers can perform different blocks or other parts of the method 200. In some examples, a first device is described as performing blocks of method 200. Some implementations can have one or more blocks of method 200 performed by one or more other devices (e.g., other server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., an application being initiated, an application entering a different phase of operation (e.g., with different input-output characteristics), a predetermined time period having expired since the last performance of method 200, and/or one or more other conditions occurring which can be specified in the settings for the method. In some implementations, such conditions can be specified, e.g., by a user, a system administrator, an application provider, etc. in stored custom preferences.

In one example, the first device can be a server device, e.g., server device 104, and can perform the method 200. In another example, another server device, e.g., server device 106, can perform the method 200. Method 200 may begin at block 202.

At block 202, a data rate of a data stream is calculated. For example, the data stream may include a plurality of records. The data stream may be received, e.g., at server device 104. Server device 104 may be an ingestion server configured to store the received data. For example, the plurality of data records in the data stream may include any type of data, e.g., from IoT devices, web data sources, software applications, or any other type of data sources.

In some implementations, each record of the plurality of data records of the data stream may be associated with a respective timestamp. Further, each record may have a size, e.g., 10 bytes, 1 kilobyte, 5 kilobytes, etc. In some implementations, each of the plurality of data records may be of the same size. In these implementations, calculating the data rate of the data stream may include calculating a number of data records per time interval (e.g., one minute) and multiplying that by the size of each data record. For example, if each data record is 1 kilobyte and a hundred records are received per minute, it may be determined that the data stream has a data rate of 100 kilobytes per minute.

In some implementations, the plurality of data records may include data records of different sizes. For example, a subset of the data records may be 10 kilobytes each while another subset may be 1 kilobyte each. In these implementations, calculating the data rate of the data stream may include calculating an average size per time interval (e.g., one minute). For example, if over a 1 minute interval, 10 records of size 10 kilobytes and 100 records of size 1 kilobyte are received, it may be determined that the data stream has a data rate of 200 kilobytes per minute (10×10 Kb+100×1 Kb). In some implementations, the averaging may be performed based on a number of records, e.g., over 100 records, over 1000 records, rather than for a particular interval of time.

In some implementations, when the size of data records is variable, the data rate for the stream may be determined as an average over a plurality of time intervals, e.g., 10 time intervals of 1 minute each may be identified and a data rate determined for each time interval, and then the data rate for the data stream may be determined as the average of the data rate for the 10 time intervals. In some implementations, the weighted averaging may be performed based on a number of records, e.g., over 100 records, over 1000 records, rather than for a particular number of time intervals. In some implementations, a number of write requests per time unit (where each write request may correspond to writing a particular data record to a storage bucket) may be calculated based on the data rate of the data stream. For example, if the data rate is 100 kilobytes with each data record having a size of 10 kilobytes, the number of write requests per time unit may be determined as 10, while if the data rate is 100 kilobytes with each record having a size of 1 kilobyte, the number of write requests per time unit may be 100. Block 202 may be followed by block 204.

At block 204, it is determined if the data rate of the data stream is less than an ingest threshold. For example, the ingest threshold may be selected based on data throughput (e.g., number of data records that can be written per time period) per storage bucket. The data throughput may be determined based on the type of server and/or storage device used to implement the storage bucket, available bandwidth of the storage bucket, ingest software workload, etc. Further, the ingest threshold may be determined based on the number and/or size of data records that can be written per time period, e.g., 100 records of 1 kilobyte each, 10 records of 9 kilobytes each, etc. In some implementations, e.g., when the data records for a data stream are of variable size, the ingest threshold may be determined based on the average size, median size, or other statistical function determined based on the data records in the data stream over a time period.

A storage bucket may include one or more storage devices. Based on the configuration of storage devices within the storage bucket, the storage bucket may support a particular quantity of write requests per time unit, e.g., 10 writes of 10 kilobytes each, 90 writes of 1 kilobyte each, etc. The ingest threshold may be set at the maximum number of write requests that the storage bucket supports per time unit. If the number of write requests per time unit of the data stream is less than the ingest threshold, block 204 may be followed by block 206. Else, block 204 may be followed by block 214.

At block 206, the storage capacity per storage bucket is determined. In some implementations, each data record of the plurality of data records may have a particular size. In these implementations, determining the storage capacity per storage bucket may include determining a maximum number of data records of the particular size that can be stored per storage bucket. For example, if each data record is 1 kilobyte and the storage bucket is 12 kilobytes, the storage capacity may be determined as 12 write requests (where each write request corresponds to writing a data record).

In some implementations, multiple data records may be combined in a single write request. For example, if a data stream includes data records of a small size, e.g., 30 bytes, 100 bytes, etc. combining multiple data records in a single write request may provide higher write efficiency. In some implementations, a single data record may be split into multiple write requests, e.g., if a data stream includes data records of a large size, e.g., 2 megabytes, etc. In these implementations, the storage capacity per storage bucket may be determined based on the number of write requests that are supported by the storage bucket and converting the number into the number of data records, based on the size (or average size) of a record in a data stream. Block 206 may be followed by block 208.

At block 208, a read interval may be determined to read data from a storage bucket. In some implementations, determining the read interval may include analyzing one or more read requests. Each read request may include a command to access a subset of the plurality of data records. For example, the read requests may be received from a data analytics application that performs an aggregation operation (e.g., a rollup operation) on data records of the data stream. For example, a read request may include a request for a subset of data records of the plurality of data records that corresponds to a particular time period (e.g., 1 pm to 1:01 pm), and the read interval may be selected as 1 minute. For example, the read interval may be a minimum interval or the most frequently used interval at which the aggregation operation is performed on the data stream.

In some implementations, determining the read interval may include grouping the one or more read requests into a plurality of sets of read requests, each set associated with a corresponding interval. In these implementations, the interval associated with the set of read requests that has the most number of read requests may be selected as the read interval. For example, if aggregation operations are performed at different intervals, e.g., 10 aggregation operations at 5-minute intervals and 100 aggregation operations at 10-minute intervals, the higher rate associated with the aggregation at 10-minute intervals may be determined and used to select the read interval as 10 minutes. Block 208 may be followed by block 210.

At block 210, a time window per storage bucket is selected based on the number of write requests per time unit, the storage capacity per storage bucket, and the read interval. In some implementations, selecting the time window per storage unit may include setting the size of the time window as the read interval and iteratively increasing the size of the time window while the number of write requests multiplied by the time window is less than the storage capacity per storage bucket. In some implementations, increasing the size of the time window may include doubling the time window at each iteration. For example, if the initial interval is 1 minute, the data rate is 5 write requests per minute, and the storage capacity is 12 write requests, the size of the time window may be selected as 2 minutes.

Further, each storage bucket may be assigned a particular time window. For example, if the size of the time window is 2 minutes and 30 storage buckets are available, each storage bucket may be assigned a time window of 2 minutes and 30 buckets may be used in a period of one hour. Block 210 may be followed by block 212.

At block 212, a first subset of data records of the plurality of data records of the data stream that correspond to the time window for a particular storage bucket are written to that storage bucket. Upon expiration of the time window, the next storage bucket is selected and a second subset of data records are written to it. Selection of buckets and writing data may continue in a round robin fashion, till all the storage buckets have been written to. At this time, the first storage bucket is selected for the next subset of data records.

Writing data in this manner may preserve spatial and/or temporal locality. For example, all data records within the time window may be written serially to a particular storage bucket, e.g., to adjacent locations on a hard disk drive, to a same flash chip of a SSD, etc. When a read request is received for records within a time interval that corresponds to the time window (e.g., is a subset of the time window), the records can be retrieved efficiently by serially reading from the storage bucket, without the need to perform an index lookup or other operation to locate the data records. Block 212 may be followed by block 202.

If the number of write requests per time unit of the data stream is greater than or equal to the ingest threshold, block 204 may be followed by block 214. At block 214, data records are written to multiple storage buckets. For example, the data records are written such that at least a first subset of the plurality of data records is written to a first storage bucket and at least a second subset of the plurality of data records is written to a second storage bucket different from the first storage bucket. In this case, there may be no allocation of storage buckets to time windows, and the data records are written to the next available storage bucket, e.g., in a round robin manner, in a random manner, etc. Writing data in this manner may not preserve spatial or temporal locality and may necessitate the use of an index to locate data records within storage buckets. Writing data in this manner may however provide high ingest throughput, since data from the data stream is written to the next available storage bucket and a plurality of available storage buckets (or all available storage buckets) can be used to write data.

In some implementations, method 200 or portions thereof may be performed at periodic intervals, e.g., once every hour, once a day, etc. Further, method 200 may be performed upon determination that a current data rate of the data stream is different from a previous data rate of the data stream.

While method 200 has been described with reference to various blocks in FIG. 2, it may be understood that the techniques described in this disclosure may be performed without performing some of the blocks of FIG. 2. In some implementations, one or more of the blocks illustrated in FIG. 2 may be combined. In various implementations, some of the blocks of method 200 may be performed in parallel or in an order different from that illustrated in FIG. 2.

In some implementations, the data stream may be partitioned based on one or more data dimensions prior to performing method 200 and method 200 may be performed for one or more of the partitions. For example, the one or more data dimensions can include a geography dimension that is included in geographic information in each data record. For example, a data record may include geographic information in the form of zip code, city, state, or other geographic parameter. In another example, the one or more data dimensions can be based on parameters such as one or more user-specific parameters included in the data records, such as, e.g., device operating system (e.g., iOS, MacOS, Android); browser (e.g., Safari, Chrome, Edge, Firefox, etc.); application version (associated with the application that is a source of data records); etc.

In some implementations, prior to performing method 200, the data stream may be partitioned based on a particular data dimension. In these implementations, method 200 may be performed for each partition of the data stream and the plurality of data records of the partition may be written to a particular storage bucket (when the data rate for the partition is less than the ingest threshold) or to two or more storage buckets (when the data rate for the partition is greater than or equal to the ingest threshold).

For example, the data stream may be partitioned based on the dimension "device operating system" based on the device OS information included in each data record of the data stream, to obtain a plurality of partitions, e.g., one for each type of OS, e.g., MacOS, iOS, Android, Chrome OS, Windows, etc. Method 200 may then be performed for each partition. In this example, the data rate for different partitions may be different. For example, if each data record is 1 kilobyte and a hundred records are received for Android, it may be determined that the data stream has a data rate of 100 kilobytes for Android, while if each data record is 2 kilobytes and a hundred records are received for MacOS, it may be determined that the data stream has a data rate of 200 kilobytes for MacOS. Further, the ingest threshold used for different partitions may be the same or different.

In some implementations, determining the data rate for each partition may be based on data records received for that partition over a particular time interval, e.g., 5 minutes, 1 hour, etc. For example, two values of data rate may be determined for two different zip codes as: 100 kilobytes per second for zip code "48109" and 10 megabytes per minute for zip code "60601." Different time intervals may be used for different partitions.

While the foregoing example illustrates partitioning the data stream with respect to a data dimension such as geography, device type, etc. and then calculating a data rate for each partition, in some implementations, partitioning of the data stream may be based on a combination of two or more data dimensions, e.g., geo+device OS (e.g., separate partitions for "California+iOS," "California+Android," etc.). Further, in different implementations, any combination of data dimensions can also be used to calculate data rates. For example, timestamp+geo, geo+OS, timestamp+device type (e.g., tablet, smartphone, wearable device, computer), timestamp+device type+geo, etc.

Example: A data source generates 10 data records per second and sends it to the ingestion server. Each data record is of a particular size, e.g., between 1-2 kilobytes of data and is associated with a timestamp. A time window is identified for the data stream, e.g., a window of one hour, and a storage bucket is allocated for this time window. In this time window, a total of 36,000 data records (10 per second×60 seconds per minute×60 minutes per hour) are received and are stored to the allocated storage bucket. Storing data in this manner ensures that data extraction operations that include sequential extracts (e.g., extract data records that have timestamps close to each other) are performed at high efficiency, due to the temporal locality (storing within the allocated storage bucket) and spatial locality (storing records sequentially based on timestamps).

At some point after the allocation of the storage bucket, the input data stream updates to a higher rate, e.g., 1,000 data records per second. This can cause the storage bucket to become overloaded, e.g., if the underlying storage device(s) of the storage do not support writes at this rate, or if the underlying storage device(s) do not have sufficient storage capacity to store the higher number of records, e.g., 3.6 million records per hour that are received at the higher rate of the data stream.

As described above, the techniques described herein recognize the change in data rate and make corresponding adjustments. For example, more storage buckets may be allocated to the data stream, e.g., instead of one storage bucket per hour, 20 storage buckets are allocated, such that each storage bucket corresponds to a smaller time window of 5 minutes, e.g., based on determining that additional storage buckets are available and that the bucket can support storing records for up to 5 minutes at the higher rate of the data stream. Allocating a single storage bucket per time window and choosing the time window flexibly can create hotspots for ingestion; however, by ensuring temporal and spatial locality, data extraction can be performed efficiently.

Alternatively, if it is determined that individual buckets do not support the higher data rate, the data records in the incoming data stream may be written to multiple storage buckets. The storage bucket for each received data record may be chosen in various ways, e.g., based on computing a hash of a portion of the received data, by randomly allocating storage buckets, by allocating storage buckets in a round robin fashion, etc. The storage buckets may each be hosted on different storage devices or hardware and can thus be accessed in parallel. Writing data records in this manner can support very high rates of incoming data streams, even when storage devices that underlie storage buckets do not individually support the rate of the data stream. Further, this ensures that no hotspots are created that can prevent successful data ingestion. While this can compromise spatial and/or temporal locality, thus affecting data extraction performance, the described techniques can ensure successful ingestion of data streams of very high rates. Data indexing can be performed after ingestion to generate an index that can help speed up data extraction.

Further, based on periodic observation of the rate of a received data stream (e.g., as described with reference to block 202 of FIG. 2), appropriate strategies can be chosen for data ingestion at different times. For example, when a data stream has a high data rate (e.g., data from online purchases at peak shopping times), high ingestion throughput can be provided by the concurrent use multiple storage buckets, and when the data stream has a lower data rate (e.g., data from purchases at other times), by the sequential use of storage buckets that preserves spatial and temporal locality.

While temporal locality is described with reference to timestamps associated with data records, other data dimensions (parameters of the data) can be used to store data to support fast extraction. For example, data may be stored such that data records originating from the same geographic region (e.g., temperature readings from a city), from the same type of device (e.g., phones running a particular OS version), or any other parameter that is used for analytics are stored in the same storage bucket, enabling quick retrieval.

The data dimensions (parameters) may be determined based on prior data extraction requests received from analytics applications. In some implementations, analytics applications may provide hints to the ingestion server regarding the parameters to optimize for when allocating storage buckets. Further, the use of single storage buckets that provide high temporal and spatial locality and the size of corresponding time windows can be based on the capabilities of storage hardware that underlies the storage bucket. Still, further, patterns in data extraction requests may be analyzed to determine time windows. For example, if data extraction requests are for data records within 5-minute periods (e.g., from an analytics application that performs a rollup operation for data within 5-minute intervals), a storage bucket may correspond to a time window of 5 minutes (or less than 5 minutes, e.g., 1 minute). Further, the use of multiple storage buckets that support high data rates and the use of single storage buckets can be dynamically toggled (e.g., based on comparison of the data rate with the ingest threshold, as described with reference to block 204 of FIG. 2), based on the current data rate of the data stream.

Figure 3:
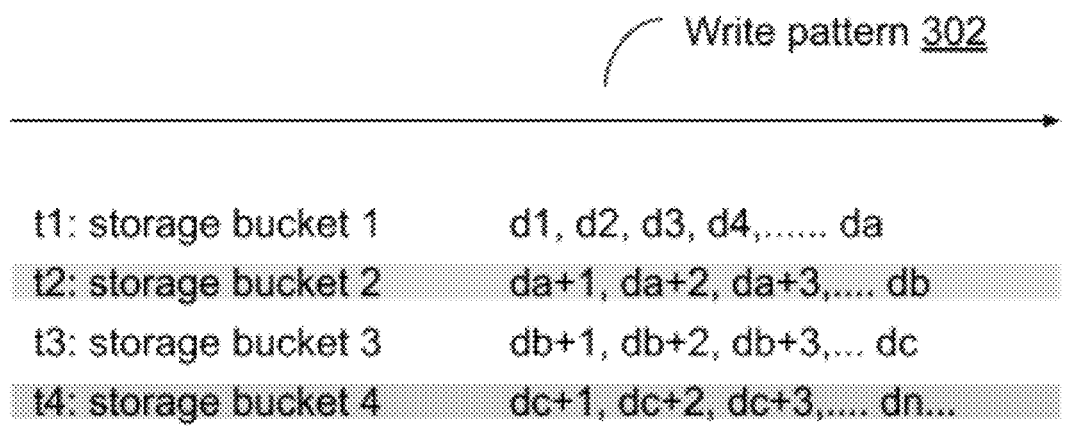
FIG. 3 is a diagrammatic illustration of storage containers allocated to different applications.

FIG. 3 illustrates an example write pattern that an ingestion server may use to write data from a data stream to maintain temporal locality. As illustrated in FIG. 3, a data stream is received from a data source. The data stream includes a plurality of records, each with an associated timestamp. For example, in a particular time period, e.g., 1 hour, the data stream may include records d1 through dn.

The time period is divided into four time windows, t1, t2, t3, and t4. Each time window is associated with a corresponding storage bucket—storage bucket 1, storage bucket 2, storage bucket 3, and storage bucket 4, as illustrated in FIG. 3. Incoming data records are stored in the corresponding bucket, based on the timestamp associated with the record. In the example illustrated in FIG. 3, the write pattern is to write data within a first time window (t1) to a first storage bucket (storage bucket 1) and for other time windows to corresponding storage buckets. As can be seen in FIG. 3, data records d1 through da are stored in storage bucket 1, data records da+1 through db are stored in storage bucket 2, data records db+1 through dc are stored in storage bucket 3, data records dc+1 through do are stored in storage bucket 4. The pattern of storage may be repeated for future time periods. Additional storage buckets may be allocated, if any of storage buckets 1-4 is unavailable.

By splitting the time period (e.g., one hour) into a plurality of time windows (e.g., 15 minutes) and allocating a particular storage bucket to individual time windows, a write pattern is provided that ensures temporal locality of stored data, e.g., data within the time window is stored in the same storage bucket (that may include one or more storage devices). This ensures that data within a particular time window can be accessed by requesting data from the particular storage bucket associated with the time window and without requiring to access other storage buckets that may be currently serving other storage or analytics workloads. Further, in some implementations, records within a single bucket (e.g., d1 through da) may be written serially to a storage device in the corresponding storage bucket (e.g., storage bucket 1) such that the stored data has spatial locality, e.g., records that are associated with similar timestamps are stored physically proximate to each other, e.g., on the same storage device such as a flash memory chip, a flash channel, adjacent positions on a hard disk drive, etc.

When data in a data stream is stored in such a manner, an analytics application may simply provide an identifier of a first record (e.g., a timestamp associated with the record) and a timespan (e.g., 10 seconds, 5 minutes, 10 minutes, etc.) in a data retrieval request. In response, data can be retrieved from the storage bucket by simply reading adjacent locations within the storage device without the analytics application being required to issue individual requests to retrieve other records. Further, the temporal locality provided by the time windows can enable analytics applications to identify storage buckets based on associated time windows and issue requests to the storage buckets that include data for a timespan for which data is to be analyzed.

Write pattern 302 may have a larger hotspot, e.g., the storage bucket that is being written to in a particular time window may receive a large number of writes in the allocated time window. Write pattern 302 enables low temporal extract latency, e.g., any application that extracts data based on timestamps can perform such extraction with low latency, e.g., lower than if the data records were written with a different write pattern (e.g., randomly writing to different buckets or other patterns).

While FIG. 3 illustrates write patterns based on a time dimension (timestamps associated with data records in a data stream), write patterns can be based on any other data dimension or a combination of two or more data dimensions. The data dimension may be selected based on characteristics of the data stream and/or analytics that are performed on the data records. For example, a geography dimension (e.g., zip code, city, state, or other geographic parameter) may be chosen when data analytics applications access data by geography, e.g., to analyze orders received from Michigan (or other individual states/geographies). In another example, a user-specific parameter (e.g., user device, browser, OS, etc.) may be chosen as the data dimension when data analytics applications access data by such parameters, e.g., advertisements delivered to MacOS users, advertisements delivered to Chrome browser, clicks received from mobile app version X, etc. Other data dimensions, or a combination of data dimensions (e.g., timestamp+geo, geo+device type, etc.) can also be used to select write patterns and allocate data writes from incoming data streams to various storage buckets.

Figure 4:
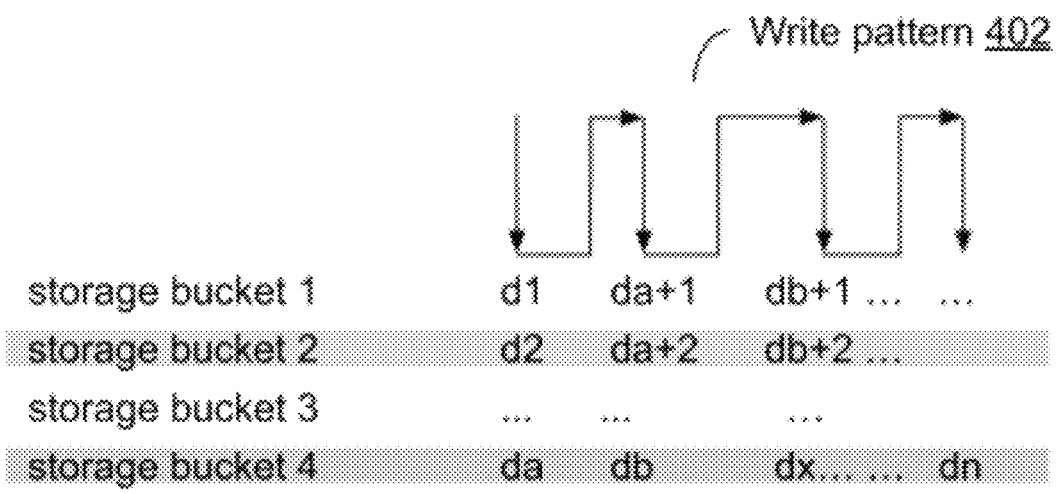
FIG. 4 is a flow diagram illustrating one example of a method 400 to update storage container configuration for a software application, according to some implementations described herein.

FIG. 4 illustrates an example write pattern that an ingestion server may use to write data from a data stream to provide high ingestion throughput.

As illustrated in FIG. 4, a data stream is received from a data source. The data stream includes a plurality of records, each with an associated timestamp. For example, the data stream may include records d1 through dn.

In the example illustrated in FIG. 4, the data records from the data stream are written to the storage buckets in a round robin manner. For example, as illustrated in FIG. 4, the first record in the data stream (d1) may be written to storage bucket 1, the second record (d2) may be written to storage bucket 2, the third record (d3) may be written to storage bucket 3, the fourth record may be written to storage bucket 4, the fifth record (d5) may be written to storage bucket 1, and so on. For example, such a write pattern may be selected when storage buckets 1-4 have identical characteristics, e.g., write latency.

While FIG. 4 shows a sequential round robin, in some implementations, each write may be not performed in strict order, and may instead be allocated to the next available storage bucket, e.g., a storage bucket that completes a write may indicate to the ingestion server that it is available. For example, such a write pattern may be selected when storage buckets 1-4 have different characteristics, e.g., different write latencies. However, in both cases, incoming data is written to a next available storage bucket, without regard for temporal or spatial locality.

As data records are written to the next available device, write pattern 402 or any other write pattern that utilizes available storage buckets, can ensure high ingest throughput, since there is no single storage bucket that can hold up data writes (no write hot spots). However, such a write pattern does not provide spatial or temporal locality. Therefore, applications that read data from storage buckets that are written using such a write pattern, may need to perform individual reads to access data records that are to be analyzed. In some implementations, an index may be built based on the written data records to enable fast access to data records.

In various applications, there is a requirement to efficiently filter data stored in the storage buckets based on one or more data dimensions such as time (based on timestamps), device type, device OS, geography, or other parameter. For example, a dashboard in an e-commerce application may provide users with information such as number of orders received per city and/or total revenue per geography for particular time periods, as illustrated in the table below:

TABLE 1

Example of a dashboard

| City | Number of orders received in the last 5 minutes | Revenue in the last 5 minutes |
|---|---|---|
| San Francisco, CA | 5,200 | $35,000 |
| Seattle, WA | 4,100 | $22,000 |
| Mountain View, CA | 1,400 | $20,000 |
| Portland, OR | 900 | $6,400 |
| Fremont, CA | 200 | $4,200 |

As can be seen, the dashboard of Table 1 is sorted in descending order by the number of orders. Further, a dashboard may be interactive, or a separate data analytics application may be provided to enable a user to perform interactive filter queries via a user interface. Still further, filter queries may also be received via an application programming interface (API). Such interactive filter queries or API-based queries may be based on a single data dimension, or combinations of data dimensions, as selected by the user.

For example, the interactive dashboard as illustrated in Table 1 may enable the user to perform a drill-down based on sub-regions within a city (e.g., different parts of San Francisco), or based on the one or more other parameters associated with orders, e.g., "orders for books only," "orders with rush delivery," "orders received via mobile app," "orders greater than $200," etc. To support such drill-down operations, it is important that the storage mechanism support efficient execution of filter queries.

However, supporting general purpose filtering in an interactive user interface such as a an interactive dashboard or data analytics application, or via an API, by executing filter queries is a difficult technical problem for conventional data storage techniques due to high cardinality of data. For example, supporting an interactive dashboard that enables drill-down based on parameters such as order type ("books only," "rush delivery," "received via mobile app,"), order amount (">$200") etc. may be difficult when the dataset includes a large number of data records and has high cardinality. Executing a filter query may require substantial computational resources may be non-deterministic in time, or may have high latencies, when the ratio of data scanned (e.g., all data records associated with orders received within the last 5 minutes) to useful data (data that matches the filter criteria (e.g., "books only") is high. For example, when only 2 orders out of the 5,200 orders received from San Francisco are for "books only," scanning the dataset may be expensive.

Further, some user interfaces may show users options for the values for filter, enabling a user to pick from them. For example, the user interface may enable users to pick a particular city to drill down on orders. However, for high-cardinality values (e.g., when the data includes a large number of cities, e.g., 10,000 cities), this approach breaks down since providing the user interface may require scanning the data to determine the values to show in the user interface (e.g., only include cities from which an order was received in the last 5 minutes).

The use of storage buckets as described herein can substantially reduce the computational cost for general purpose filter queries, as well as enable processing of filter queries with minimal latency. For example, at a time of ingestion, the data stream may be partitioned (as described with reference to FIG. 2) based on data dimensions that are parameters for filter queries. For example, the data stream may be partitioned based on geography such that data records for orders from cities within each state (e.g., California) are in the same storage bucket and are laid out consecutively (e.g., data records for San Francisco being stored in order, followed by data records for San Jose) in the storage bucket such that a seek operation can be performed to the specific values being filtered (e.g., selection of particular cities).

Further, after writing the plurality of data records of the data stream to storage buckets (or during the process of writing the data records), data views may be created and stored automatically by grouping the data records based on particular values of a dimension. For example, to support dashboards that provide different visualizations of data (e.g., at 5-minute intervals based on city as shown in Table 1), data views or rollups may be created that aggregate data, e.g., for the 5-minute interval based on data dimensions in the dashboard (e.g., grouped by City, with fields for order count and revenue aggregation field), data dimensions supported by an interactive user interface or an API. Multiple data views or rollups based on the same data may be created and stored, e.g., to support different dashboards, or filter queries. Entries in the stored data views and/or rollups may be stored, e.g., in the storage bucket, sequentially based on values for particular data dimensions (e.g., the view may be sorted by "city"). This can enable seeking (in the storage bucket) to the specific value that is being used in a filter to read and return the data that matches the filter, rather than performing a scan of the stored data.

Still further, an index of unique values for one or more data dimensions within a data stream that may be queryable (e.g., city, device type, device OS, etc.) via a user interface or API may also be created and stored in order in the storage bucket. The index can be used to perform a lookup of a subset of values based on partial input by a user. For example, if the filter field is "city" and the user enters the text "Sa" in the data analytics application, the index can be looked up to provide a subset of cities that match the text (e.g., "San Francisco," "San Jose," "San Luis Obispo," etc.) to the data analytics application to display in the user interface. The user data entry can be via key presses, or other interactive user interface such as a map, checkboxes, etc.

Provision of stored data views or rollups, and index, can improve dashboards and other interactive user interfaces, as well as programmatic access to data via an API by reducing the amount of time required for and/or computational resources utilized to display data visualizations, enable data filtering, etc. Ordered storage of entries with data views or rollups and index in a storage bucket can also ensure that arbitrary filter queries that rely on fields captured within the data views or rollups, or query specification based on the index, are performed with little or no latency, and within a deterministic amount of time from user input or programmatic request for data received via an API. Thus, near real-time views of data streams are made possible with the described techniques.

Figure 5:
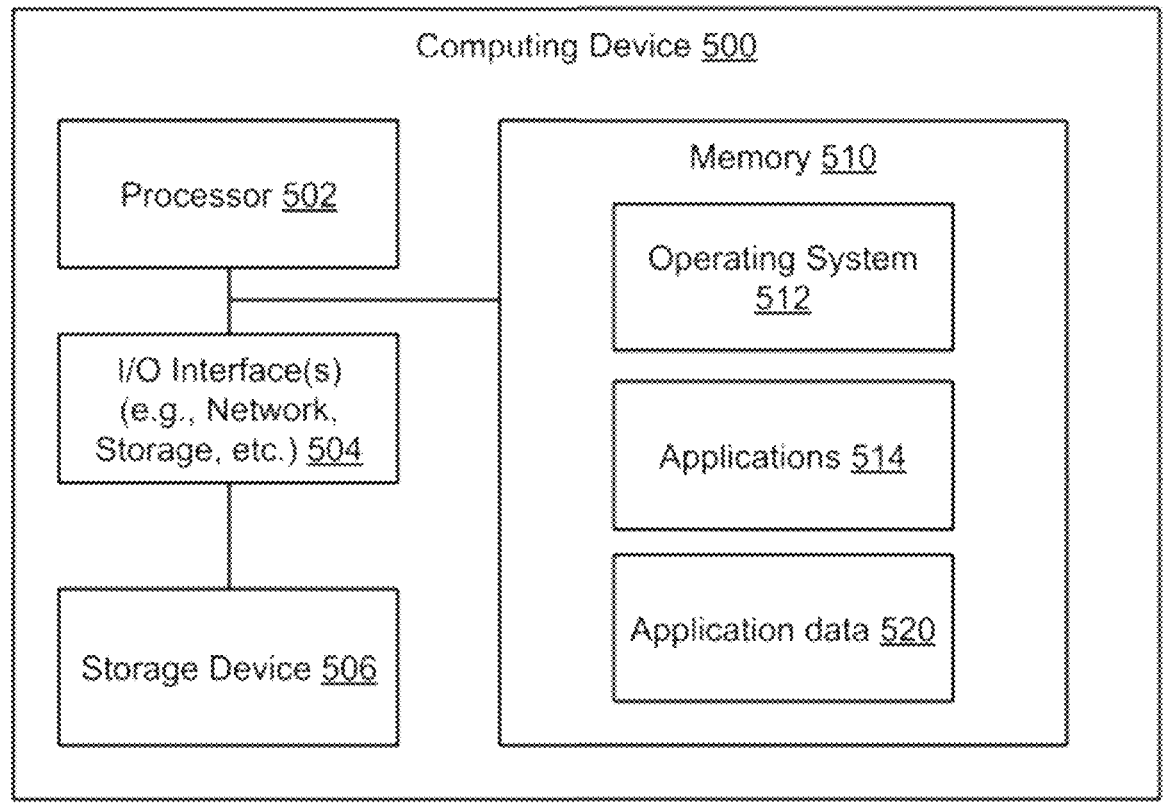
FIG. 5 is a block diagram of an example computing device 500 which may be used to implement one or more features described herein.

FIG. 5 is a block diagram of an example computing device 500 which may be used to implement one or more features described herein. In one example, device 500 may be used to implement a computer device, e.g., a storage optimization device, and perform appropriate method implementations described herein. Device 500 can be any suitable computer system, server, or other electronic or hardware device. For example, the device 500 can be a mainframe computer, server computer, desktop computer, workstation, portable computer, or medical device. In some implementations, device 500 includes a processor 502, input/output (I/O) interface 504, one or more storage devices 506, and a memory 510.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 510 is typically provided in device 500 for access by the processor 502 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 510 can store software operating on the server device 500 by the processor 502, including an operating system 512, one or more applications 514, e.g., a data ingestion application, a data analytics application, etc., and application data 520. In some implementations, applications 514 can include instructions that enable processor 502 to perform the functions described herein, e.g., some or all of the methods of FIG. 2. Memory 510 also stores application data 520, e.g., data from an incoming data stream or data records retrieved from a storage bucket for one or more of applications 514.

Any of software in memory 510 can alternatively be stored on any other suitable storage location or computer-readable medium. In addition, memory 510 (and/or other connected storage device(s)) can store other instructions and data used in the features described herein. Memory 510 and any other type of storage (magnetic disk, optical disk, magnetic tape, or other tangible media) can be considered "storage" or "storage devices."

I/O interface 504 can provide functions to enable interfacing the computing device 500 with other systems and devices. For example, network communication devices, external storage devices, and other input/output devices can communicate via interface 504. In some implementations, the I/O interface 504 can connect to interface devices including input devices (keyboard, pointing device, touchscreen, microphone, camera, scanner, etc.) and/or output devices (display device, speaker devices, printer, motor, etc.).

Storage device 506 is one example of a storage device, e.g., a solid-state storage device, a hard disk drive, etc. that can be used by operating system 512 and/or one or more applications 514. Storage device 506 is a direct attached storage device, e.g., coupled to processor 502 and directly controlled by processor 502. Processor 502 is coupled to I/O interface(s) 504, storage device 506, and memory 510 via local connections (e.g., a PCI bus, or other type of local interface) and/or via networked connections.

For ease of illustration, FIG. 5 shows one block for each of processor 502, I/O interface 504, storage device 506, and memory 510 with software blocks 512, 514, and 520. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. Any suitable component or combination of components of system 102 or similar system, or any suitable processor or processors associated with such a system, may perform the operations described, e.g., with reference to FIG. 2.

A user device can also implement and/or be used with features described herein. Example user devices can be computer devices including some similar components as the computing device 500. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method comprising:
calculating a data rate of a data stream that includes a plurality of data records;
determining if the data rate of the data stream is less than an ingest threshold; and
if the data rate of the data stream is less than the ingest threshold,
calculating a number of write requests per time unit based on the data stream;
determining a storage capacity per storage bucket;
determining a read interval for the data stream;
based on the number of write requests per time unit, the storage capacity, and the read interval, selecting a size of time window per storage bucket; and
writing the plurality of data records to a particular storage bucket.

2. The computer-implemented method of claim 1, wherein each data record of the plurality of data records has a particular size and wherein determining the storage capacity per storage bucket comprises determining a maximum number of data records of the particular size that can be stored per storage bucket.

3. The computer-implemented method of claim 1, wherein determining the read interval comprises analyzing one or more read requests, wherein each read request includes a command to access a subset of the plurality of data records.

4. The computer-implemented method of claim 3, wherein determining the read interval comprises selecting an initial read interval as a minimum interval at which an aggregation operation is performed on the data stream, the read interval selected detected based on the one or more read requests.

5. The computer-implemented method of claim 3, further comprising grouping the one or more read requests into a plurality of sets of read requests, each set associated with a corresponding interval, and wherein determining the read interval comprises selecting the interval associated with the set of read requests that has the most number of read requests as the read interval.

6. The computer-implemented method of claim 1, further comprising, if the data rate of the data stream is greater than or equal to the ingest threshold, writing the plurality of data records such that at least a first subset of the plurality of data records is written to a first storage bucket and at least a second subset of the plurality of data records is written to a second storage bucket different from the first storage bucket.

7. The computer-implemented method of claim 1, further comprising, prior to calculating the data rate, partitioning the data stream into a plurality of partitions based on one or more data dimensions of the data stream.

8. The computer-implemented method of claim 1, further comprising:
creating a data view that includes a plurality of entries, wherein the data view is based on one or more data dimensions of the data stream; and
storing the data view in the particular storage bucket such that the plurality of entries in the data view are stored sequentially based on at least one of the one or more data dimensions of the data stream.

9. The computer-implemented method of claim 1, further comprising:
creating an index based on the data stream, wherein the index includes a plurality of unique values for a particular data dimension of the data stream; and
storing the index in the particular storage bucket such that the plurality of unique values are stored sequentially.

10. The computer-implemented method of claim 1, wherein the method is performed at periodic intervals or upon determination that a current data rate of the data stream is different from a previous data rate of the data stream.

11. A computing device comprising:
one or more processors; and
a memory coupled to the one or more processors, with instructions stored thereon that, when executed by the one or more processors, cause the one or more processors to perform operations comprising:
calculating a data rate of a data stream that includes a plurality of data records;
determining if the data rate of the data stream is less than an ingest threshold; and
if the data rate of the data stream is less than the ingest threshold,
calculating a number of write requests per time unit based on the data stream;
determining a storage capacity per storage bucket;
determining a read interval for the data stream;
based on the number of write requests per time unit, the storage capacity, and the read interval, selecting a size of time window per storage bucket; and
writing the plurality of data records to a particular storage bucket.

12. The computing device of claim 11, wherein each data record of the plurality of data records has a particular size and wherein determining the storage capacity per storage bucket comprises determining a maximum number of data records of the particular size that can be stored per storage bucket.

13. The computing device of claim 11, wherein determining the read interval comprises analyzing one or more read requests, wherein each read request includes a command to access a subset of the plurality of data records.

14. The computing device of claim 11, wherein the operations further comprise, if the data rate of the data stream is greater than or equal to the ingest threshold, writing the plurality of data records such that at least a first subset of the plurality of data records is written to a first storage bucket and at least a second subset of the plurality of data records is written to a second storage bucket different from the first storage bucket.

15. The computing device of claim 11, wherein the operations further comprise, prior to calculating the data rate, partitioning the data stream into a plurality of partitions based on one or more data dimensions of the data stream.

16. A non-transitory computer-readable medium with instructions stored thereon that, when executed by one or more processors, cause the one or more processors to perform operations comprising:
calculating a data rate of a data stream that includes a plurality of data records;
determining if the data rate of the data stream is less than an ingest threshold; and
if the data rate of the data stream is less than the ingest threshold,
calculating a number of write requests per time unit based on the data stream;
determining a storage capacity per storage bucket;
determining a read interval for the data stream;
based on the number of write requests per time unit, the storage capacity, and the read interval, selecting a size of time window per storage bucket; and
writing the plurality of data records to a particular storage bucket.

17. The non-transitory computer-readable medium of claim 16, wherein each data record of the plurality of data records has a particular size and wherein determining the storage capacity per storage bucket comprises determining a maximum number of data records of the particular size that can be stored per storage bucket.

18. The non-transitory computer-readable medium of claim 16, wherein determining the read interval comprises analyzing one or more read requests, wherein each read request includes a command to access a subset of the plurality of data records.

19. The non-transitory computer-readable medium of claim 16, wherein the operations further comprise, if the data rate of the data stream is greater than or equal to the ingest threshold, writing the plurality of data records such that at least a first subset of the plurality of data records is written to a first storage bucket and at least a second subset of the plurality of data records is written to a second storage bucket different from the first storage bucket.

20. The non-transitory computer-readable medium of claim 16, wherein the operations further comprise, prior to calculating the data rate, partitioning the data stream into a plurality of partitions based on one or more data dimensions of the data stream.

* * * * *